(12) United States Patent
Nakamura et al.

(10) Patent No.: US 6,875,534 B2
(45) Date of Patent: Apr. 5, 2005

(54) POLYMER ELECTROLYTE FUEL-CELL SEPARATOR SEALING RUBBER COMPOSITION

(75) Inventors: Tsutomu Nakamura, Gunma-ken (JP); Noriyuki Meguriya, Gunma-ken (JP); Hironao Fujiki, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/175,048

(22) Filed: Jun. 20, 2002

(65) Prior Publication Data

US 2003/0045615 A1 Mar. 6, 2003

(30) Foreign Application Priority Data

Jun. 22, 2001 (JP) ........................................ 2001-189947

(51) Int. Cl.$^7$ .......................... H01M 2/08; H01M 8/02; B32B 15/06; B32B 9/04; B32B 25/20
(52) U.S. Cl. .............................. 429/36; 429/34; 429/35; 429/129; 429/247; 429/249; 429/254; 447/447; 525/100; 525/106; 525/477; 525/478; 525/479
(58) Field of Search ................................ 525/100, 106, 525/477, 478, 479; 528/15, 25, 31, 32; 524/268, 588; 428/447; 429/34, 35, 36, 129, 247, 249, 254

(56) References Cited

U.S. PATENT DOCUMENTS

| | | | | |
|---|---|---|---|---|
| 3,989,668 A | * | 11/1976 | Lee et al. | 525/478 |
| 4,737,421 A | * | 4/1988 | Uemura et al. | 429/34 |
| 4,753,978 A | * | 6/1988 | Jensen | 524/862 |
| 5,728,768 A | * | 3/1998 | Saxena et al. | 524/506 |
| 5,880,195 A | * | 3/1999 | Kalinowski et al. | 524/426 |
| 5,952,419 A | * | 9/1999 | DeGroot et al. | 524/506 |
| 6,005,051 A | * | 12/1999 | Kennedy et al. | 525/106 |
| 6,060,559 A | * | 5/2000 | Feng et al. | 525/105 |
| 6,150,441 A | * | 11/2000 | Chiba et al. | 524/101 |
| 6,153,326 A | | 11/2000 | Matsukawa et al. | |
| 6,410,772 B2 | * | 6/2002 | Okuyama et al. | 556/479 |
| 6,528,584 B2 | * | 3/2003 | Kennedy et al. | 525/101 |
| 2002/0048680 A1 | * | 4/2002 | Yamanaka | 428/447 |

FOREIGN PATENT DOCUMENTS

| | | |
|---|---|---|
| JP | 2000-920 A | 1/2000 |
| JP | 2000-33630 A | 2/2000 |
| JP | 2000-48832 A | 2/2000 |
| JP | 2000-62086 A | 2/2000 |
| JP | 2000-77084 A | 3/2000 |
| JP | 2000-133290 A | 5/2000 |
| JP | 2000-156215 A | 6/2000 |
| JP | 2000-176962 A | 6/2000 |
| JP | 2000-188118 A | 7/2000 |
| JP | 2000-231927 A | 8/2000 |
| JP | 2001-199002 A | 7/2001 |
| JP | 2001-216979 A | 8/2001 |

* cited by examiner

*Primary Examiner*—Jeffrey B. Robertson
(74) *Attorney, Agent, or Firm*—Birch, Stewart, Kolasch & Birch, LLP

(57) ABSTRACT

A rubber composition comprising (A) a polyisobutylene polymer having an allyl radical at an end, (B) an optional organpolysiloxane, (C) an organohydrogenpolysiloxane having at least two SiH radicals per molecule, and (D) a platinum group metal catalyst forms a seal member on a periphery of one side of a polymer electrolyte fuel-cell separator. Due to improved acid resistance, weather resistance, creep resistance and gas permeability, the seal member remains effective for a long period of time.

12 Claims, 1 Drawing Sheet

POLYMER ELECTROLYTE FUEL-CELL SEPARATOR SEALING RUBBER COMPOSITION

This invention relates to a rubber composition for use with separators in polymer electrolyte fuel cells which are typical small size fuel cells, the rubber composition providing a seal member having the advantages of easy molding and long-term service. It also relates to a seal member formed from the rubber composition and a polymer electrolyte fuel cell separator.

BACKGROUND OF THE INVENTION

Fuel cells have the great advantages that there is in a substantial sense no need for the fossil fuel which requires to pay attention to the depletion of resource, no or little noise is produced upon power generation, and the recovery of energy is high as compared with other energy power generation devices. The construction of fuel cells as relatively small size power generation plants installed in buildings and factories has been under development and some are used in practice. In particular, polymer electrolyte fuel cells operate at low temperature as compared with other types of fuel cell. They eliminate in a material aspect a concern about the corrosion of cell constituent parts and can discharge a relatively high current flow for low-temperature operation. They are thus of great interest not only as household cogeneration devices, but also as substitute power supplies for internal combustion engines on vehicles.

The polymer electrolyte fuel cells are constructed of several components including a separator which is generally in the form of a plate having a plurality of parallel channels in one or both surfaces thereof. The separator plays the roles of conducting to the exterior the electricity generated on the gas diffusing electrode within the fuel cell, discharging the water formed in the channels during the electricity generation process and maintaining the channels as a flowpath for reactant gas to flow into the fuel cell. The fuel-cell separators are required to be reduced in size. Additionally, since a plurality of separators are used in stack, there is a need for a separator sealing material which remains fully durable in long-term service.

As the separator sealing material, packing materials based on various resins have been under study in the art. Sealing materials based on silicone rubber are often employed for their moldability, heat resistance and elasticity. The silicone sealing materials, however, suffer from the drawback that they become decomposed upon contact with acidic ion-exchange resins, losing reliability.

SUMMARY OF THE INVENTION

An object of the invention is to provide a rubber composition for use with polymer electrolyte fuel-cell separators, which forms a seal member featuring improved acid resistance and long-term service. Another object is to provide a seal member formed from the rubber composition and a polymer electrolyte fuel cell separator.

It has been found that an olefinic rubber composition comprising a polyisobutylene polymer having an allyl radical on at least one end, alone or in combination with an organopolysiloxane of the formula (1) below, an organohydrogenpolysiloxane having at least two hydrogen atoms each attached to a silicon atom per molecule, and a platinum group metal catalyst forms a seal member having improved acid resistance, weather resistance, creep resistance, and gas permeability.

The present invention provides a rubber composition for sealing a periphery of at least one side of a polymer electrolyte fuel-cell separator, comprising:
(A) a polyisobutylene polymer having an allyl radical on at least one end,
(B) an organpolysiloxane of the average compositional formula (1):

$$R^1{}_n SiO_{(4-n)/2} \quad (1)$$

wherein $R^1$ is a substituted or unsubstituted monovalent hydrocarbon radical and may be the same or different and n is a positive number of 1.9 to 2.1, a weight ratio of components (A) to (B) being between 100:0 and 5:95,
(C) an organohydrogenpolysiloxane having at least two hydrogen atoms each attached to a silicon atom per molecule, in such an amount as to give 0.2 to 10 silicon-attached hydrogen atoms per aliphatic unsaturated bond in components (A) and (B), and
(D) a catalytic amount of a platinum group metal catalyst.

In a preferred embodiment, the organohydrogenpolysiloxane (C) has a structure of the general formula (2) or (3).

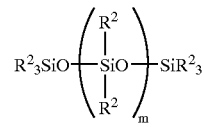

(2)

Herein $R^2$ is hydrogen or a substituted or unsubstituted monovalent hydrocarbon radical and may be the same or different, at least two $R^2$ radicals, more preferably at least three $R^2$ radicals are hydrogen atoms, at least 5 mol % of $R^2$ is phenyl, and m is an integer of from 0 to 100.

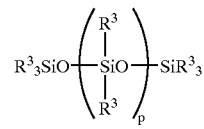

(3)

Herein $R^3$ is hydrogen or a substituted or unsubstituted monovalent hydrocarbon radical and may be the same or different, at least two $R^3$ radicals, more preferably at least three $R^3$ radicals are hydrogen atoms, and p is an integer of from 0 to 10. The rubber composition should preferably be injection moldable.

In another aspect, the present invention provides a polymer electrolyte fuel-cell separator comprising a metal thin plate and a seal member formed along a periphery on at least one side of the metal plate by injection molding the rubber composition, and curing thereto; or a polymer electrolyte fuel-cell separator comprising a substrate including an electrically conductive powder and a binder, and a seal member formed along a periphery on at least one side of the substrate by injection molding or compression molding the rubber composition, and curing thereto.

DESCRIPTION OF THE PREFERRED EMBODIMENTS

Figure 1:
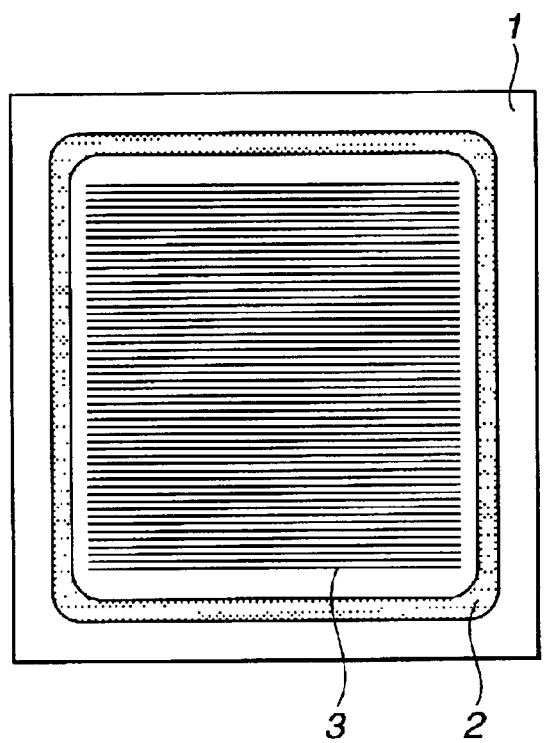
FIG. 1 is a plan view of one exemplary polymer electrolyte fuel-cell separator according to the invention.

Component (A) in the rubber composition of the invention is a polyisobutylene polymer preferably having a linear structure and having an allyl radical (allyl group) on at least one end, preferably both ends of the molecular chain, and preferably having a number average molecular weight (Mn) of 1,000 to 100,000, especially 5,000 to 20,000. Polyisobutylene develops weather resistance and low moisture permeability after the allyl radical at the molecular end undergoes curing reaction. The polyisobutylene polymer should preferably have a viscosity of about 10 to 10,000 Pa·S, especially about 50 to 5,000 Pa·S at 25° C.

Component (B) in the rubber composition of the invention is an organpolysiloxane of the average compositional formula (1):

$$R^1{}_n SiO_{(4-n)/2} \tag{1}$$

wherein $R^1$ is a substituted or unsubstituted monovalent hydrocarbon radical and may be the same or different and n is a positive number of 1.9 to 2.1.

The substituted or unsubstituted monovalent hydrocarbon radicals represented by $R^1$ are generally those of 1 to 10 carbon atoms, especially 1 to 8 carbon atoms, and include alkyl radicals such as methyl, ethyl, propyl, butyl, hexyl and octyl; cycloalkyl radicals such as cyclopentyl and cyclohexyl; alkenyl radicals such as vinyl, allyl and propenyl; cycloalkenyl radicals such as cyclohexenyl; aryl radicals phenyl and tolyl; aralkyl radicals such as benzyl and phenylethyl; as well as substituted radicals in which some or all of the hydrogen atoms on the foregoing are replaced by chloro, fluoro or cyano radicals, that is, halogenated hydrocarbon radicals and cyano hydrocarbon radicals.

In general, the preferred organopolysiloxanes have a backbone consisting of dimethylsiloxane units, or a backbone of dimethylsiloxane units having partially incorporated therein phenyl, vinyl or 3,3,3-trifluoropropyl radicals, such as combinations of dimethylsiloxane units with diphenylsiloxane units, methylvinylsiloxane units, or methyl-3,3,3-trifluoropropylsiloxane units.

The preferred organopolysiloxanes (B) are those having at least two aliphatic unsaturated radicals such as alkenyl or cycloalkenyl radicals per molecule. Of the aliphatic unsaturated radicals, vinyl is most preferred. Also preferably, the aliphatic unsaturated radicals account for 0.01 to 20 mol %, especially 0.02 to 10 mol % of the entire $R^1$.

It is understood that the aliphatic unsaturated radicals may be attached to a silicon atom at the molecular chain end or a silicon atom midway the molecular chain or both. It is preferred that aliphatic unsaturated radicals attached to silicon atoms at the both ends of the molecular chain be included. The letter n is a positive number of 1.9 to 2.1, and preferably 1.95 to 2.05.

The preferred organopolysiloxanes used herein are those end-capped with triorganosiloxy radicals such as trimethylsilyl, dimethylphenylsilyl, dimethylhydroxysilyl, dimethylvinylsilyl and trivinylsilyl radicals. More preferred organopolysiloxanes are methylvinylpolysiloxane, methylphenylvinylpolysiloxane, and methyltrifluoropropylvinylpolysiloxane.

Such organopolysiloxanes are produced, for example, by (co)hydrolysis and condensation of one or more organohalogenosilanes, or ring-opening polymerization of a cyclic polysiloxane (e.g., siloxane trimer and tetramer) in the presence of a basic or acidic catalyst. In general, the organopolysiloxanes are preferably linear diorganopolysiloxanes although a mixture of two or more organopolysiloxanes of different molecular structures is also useful. The organopolysiloxanes should preferably have a viscosity of at least about 100 centistokes (cSt) at 25° C., and especially about 100,000 to 100,000,000 cSt at 25° C. Also preferably they have an average degree of polymerization of at least about 100, and especially about 3,000 to 20,000.

In the composition of the invention, the polyisobutylene polymer (A) and the organopolysiloxane (B) preferably containing aliphatic unsaturated radicals are present in a weight ratio (A/B) between 100:0 and 5:95, preferably between 100:0 and 60:40, and more preferably between 100:0 and 70:30. If component (B) is used, the weight ratio of A/B is preferably up to 99/1, especially up to 95/5.

Component (C) in the rubber composition of the invention is an organohydrogenpolysiloxane having at least two hydrogen atoms, preferably at least three hydrogen atoms, each attached to a silicon atom (i.e., at least two SiH radicals) per molecule. The organohydrogenpolysiloxane may have a straight, branched or cyclic structure or three-dimensional network structure. Any organohydrogenpolysiloxane well known as the crosslinking agent for addition reaction curing type silicone rubber compositions may be used. Most often, the organohydrogenpolysiloxane (C) is represented by the following average compositional formula (4).

$$R^4{}_a H_b SiO_{(4-a-b)/2} \tag{4}$$

In formula (4), $R^4$ is a substituted or unsubstituted monovalent hydrocarbon radical and may be the same or different. Examples are as described for $R^1$, preferably those free of aliphatic unsaturation. Suitable hydrocarbon radicals are those of 1 to 12 carbon atoms, especially 1 to 8 carbon atoms, for example, alkyl radicals such as methyl, ethyl and propyl, cycloalkyl radicals such as cyclohexyl, alkenyl radicals such as vinyl, allyl, butenyl and hexenyl, aryl radicals such as phenyl and tolyl, aralkyl radicals such as benzyl, 2-phenylethyl and 2-phenylpropyl, and substituted ones of the foregoing radicals in which some or all of the hydrogen atoms are substituted with halogen atoms, such as 3,3,3-trifluoropropyl. The letter "a" is a positive number of 0.7 to 2.2, "b" is a positive number of 0.002 to 1, and a+b is from 0.8 to 3.

The preferred organohydrogenpolysiloxanes are those of the general formula (2) or (3), but not limited thereto.

In formula (2), $R^2$ is hydrogen or a substituted or unsubstituted monovalent hydrocarbon radical and may be the same or different, at least two $R^2$ radicals, preferably at least three $R^2$ radicals are hydrogen atoms, and at least 5 mol %, preferably 5 to 50 mol % of $R^2$ is phenyl. Letter m is an integer of from 0 to 100, preferably 0 to 20.

In formula (3), $R^3$ is hydrogen or a substituted or unsubstituted monovalent hydrocarbon radical and may be the same or different, and at least two $R^3$ radicals, preferably at least three $R^3$ radicals are hydrogen atoms. Letter p is an integer of from 0 to 10.

Illustrative examples of the monovalent hydrocarbon radicals represented by $R^2$ and $R^3$ are the same as exemplified for $R^4$, and preferably those of 1 to 12 carbon atoms, especially 1 to 8 carbon atoms, and free of aliphatic unsaturation.

Illustrative, non-limiting examples of the organohydrogenpolysiloxane include compounds of the following structural formulae.

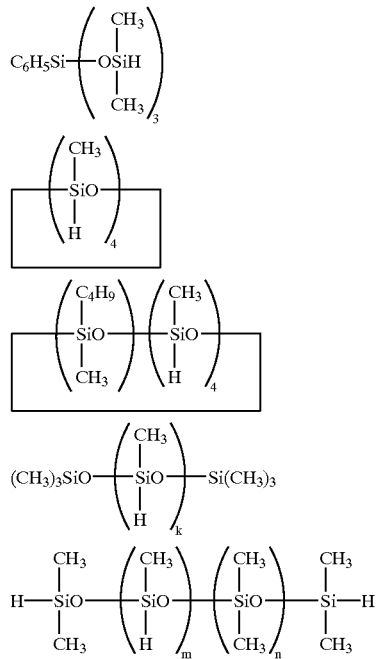

Herein, k is an integer of 2 to 10, m and n each are an integer of 0 to 10.

As mentioned above, the organohydrogenpolysiloxane has at least two SiH radicals, preferably at least three SiH radicals per molecule while the SiH radicals may be positioned at the end or an intermediate of the molecular chain or both. The organohydrogenpolysiloxane should preferably have a viscosity of about 0.5 to 10,000 cSt at 25° C., and especially about 1 to 300 cSt at 25° C.

The organohydrogenpolysiloxane is blended in such an amount as to give 0.2 to 10, preferably 0.5 to 10, and more preferably 0.7 to 5 silicon-attached hydrogen atoms (SiH radicals) per aliphatic unsaturated bond (e.g., alkenyl, diene) in components (A) and (B). If this ratio is less than 0.2, insufficient crosslinking takes place, failing to achieve mechanical strength. If this ratio is more than 10, some cured properties worsen, as typified by a substantial loss of heat resistance and an increase of compression set. Specifically, an appropriate amount of the organohydrogen-polysiloxane (C) blended is 0.1 to 40 parts by weight per 100 parts by weight of components (A) and (B) combined.

Component (D) in the rubber composition of the invention is a platinum group metal catalyst for promoting addition reaction between aliphatic unsaturated bonds (e.g., alkenyl, diene) in components (A) and (B) and silicon atom-attached hydrogen atoms in the organohydrogenpolysiloxane (C). Suitable platinum group metal catalysts include platinum group metals and compounds thereof. Any of such compounds well known as the catalyst for conventional addition reaction curing type silicone rubber compositions may be used. Examples include microparticulate platinum metal adsorbed on carriers such as silica, alumina and silica gel, platinic chloride, chloroplatinic acid, alcohol solutions of chloroplatinic acid hexahydrate, palladium catalysts, and rhodium catalysts, with platinum and platinum compounds being preferred.

The amount of the catalyst added is a catalytic amount capable of promoting addition reaction and usually about 1 ppm to 1 wt %, especially about 10 to 100 ppm of platinum group metal based on the weight of components (A), (B) and (C) combined. Less than 1 ppm of platinum group metal may be insufficient for addition reaction to proceed, resulting in under-curing and under-foaming. More than 1 wt % may give little or no additional effects to the reactivity and be uneconomical.

In addition to the aforementioned components, an addition crosslinking regulator may be used in the rubber composition of the invention for the purpose of regulating the cure rate. Examples of the addition crosslinking regulator include ethynylcyclohexanol and tetracyclomethylvinylpolysiloxane.

If necessary, optional components may be used for the purpose of adjusting the physical properties of the cured product. Optional components which can be added include fillers such as fumed silica, precipitated silica, aluminum silicate, quartz powder, fused quartz powder, diatomaceous earth, talc, clay, calcium carbonate, and titanium dioxide; conductive agents such as carbon black; flame retardants such as iron oxide and halogen compounds; softeners, antioxidants, UV absorbers, and colorants. The filler, when used, may be blended in an amount of up to 500 parts, preferably 1 to 250 parts, and more preferably 5 to 100 parts by weight per 100 parts by weight of components (A) and (B) combined. More than 500 parts by weight of the filler may result in cured products which are hard and brittle.

The rubber composition of the invention is obtained by mixing the predetermined amounts of the aforementioned components in a suitable mixer such as a two-roll mill, kneader or Banbury mixer. If necessary, a synthetic hydrocarbon oil or mineral oil base softener is added in the mixing step because it is effective for reducing the viscosity of the composition for easy working. Such softeners include liquid paraffin and commercially available products such as Lucant HC40 from Mitsui Chemical Co., Ltd. and PW-380 from Idemitsu Kosan Co., Ltd.

In the practice of the invention, the rubber composition is molded and cured into a predetermined seal shape, yielding a polyolefin rubber seal member for polymer electrolyte fuel-cell separators. Injection molding is preferred. In this regard, the rubber composition should preferably have a viscosity of about 50 to 50,000 Pa·S, especially about 100 to 10,000 Pa·S at 25° C. In general, desired curing conditions include a temperature of 100 to 300° C. and a time of 0.5 to 30 minutes. Secondary vulcanization may be conducted if necessary.

Figure 2:
FIG. 2 is a cross-sectional view of the separator.

In the practice of the invention, the rubber composition is injection molded and cured to a peripheral portion of a metal plate. Referring to FIGS. 1 and 2, a polymer electrolyte fuel-cell separator is shown as comprising a substrate or metal thin plate 1. A seal portion or member 2 is formed along the periphery of the substrate 1 in a closed loop shape, by injection molding and curing the polyolefin rubber composition of the invention. The substrate 1 is formed with gas flow channels 3. The preferred injection molding technique is by holding the metal plate within a mold and injection molding the rubber composition thereto which is known as an insert molding technique. The seal member formed by injection molding preferably has a thickness or height of 0.1 to 2 mm as best shown in FIG. 2. A seal member of less than 0.1 mm is sometimes difficult to injection mold and fails to provide an effective seal. A seal thickness of more than 2 mm may interfere with size reduction.

In another embodiment, a substrate comprising an electrically conductive powder and a binder is used. The rubber composition is injection or compression molded and cured to a peripheral portion of the substrate, yielding a polymer electrolyte fuel-cell separator having cured thereto a seal member of the polyolefin rubber composition. The substrate in this embodiment is a fuel-cell separator substrate made up from an electrically conductive powder and a binder. Examples of the electrically conductive powder include natural graphite such as flake graphite, artificial graphite, and conductive carbon black such as acetylene black and Ketjen Black, but are not limited thereto. Exemplary binders include epoxy resins and rubber-modified phenolic resins. The injection molding technique and the thickness of the seal member are the same as used in the molding on a metal plate.

EXAMPLE

Examples of the invention are given below by way of illustration and not by way of limitation. All parts are by weight.

Example 1

A rubber compound was prepared by mixing 100 parts of polyisobutylene having an allyl radical introduced at either end of the molecular chain (Mn 5,000, viscosity 60 Pa·S) and 20 parts of silica having a specific surface area of 200 $m^2/g$ (Aerosil 200 by Nippon Aerosil Co., Ltd.) in a kneader at 100° C. for 3 hours.

Using a twin-roll mill, 1.5 parts of an organohydrogenpolysiloxane of the formula (i):

wherein Me is methyl, 0.06 part of ethynylcyclohexanol as an addition crosslinking regulator, and 0.05 part of a 5% isopropyl alcohol solution of chloroplatinic acid were added to the rubber compound. The composition was press cured at 150° C. for 10 minutes to form a sheet of 1 mm thick. A specimen of 30 mm×30 mm cut out of the sheet was examined for acid resistance by immersing it in a 10% aqueous sulfuric acid solution at 100° C. for 500 hours and calculating a weight change. The result is shown in Table 1.

Example 2

A rubber compound was prepared by mixing 100 parts of polyisobutylene having an allyl radical introduced at either end of the molecular chain (Mn 5,000, viscosity 60 Pa·S), 10 parts of an organopolysiloxane consisting of 99.85 mol % dimethylsiloxane units, 0.125 mol % methylvinylsiloxane units and 0.025 mol % dimethylvinylsiloxane units and having an average degree of polymerization of about 8,000, and 20 parts of silica having a specific surface area of 200 $m^2/g$ (Aerosil 200 by Nippon Aerosil Co., Ltd.) in a kneader at 100° C. for 3 hours. Using a twin-roll mill, 1.5 parts of an organohydrogenpolysiloxane of the formula (ii):

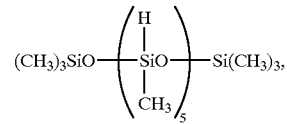

0.06 part of ethynylcyclohexanol as an addition crosslinking regulator, and 0.05 part of a 5% isopropyl alcohol solution of chloroplatinic acid were added to the rubber compound. The composition was press cured at 150° C. for 10 minutes to form a sheet of 1 mm thick. Acid resistance was tested as in Example 1, with the result shown in Table 1.

Example 3

A rubber compound was prepared by mixing 100 parts of polyisobutylene having an allyl radical introduced at either end of the molecular chain (Mn 5,000, viscosity 60 Pa·S), 30 parts of an organopolysiloxane consisting of 99.85 mol % dimethylsiloxane units, 0.125 mol % methylvinylsiloxane units and 0.025 mol % dimethylvinylsiloxane units and having an average degree of polymerization of about 8,000, 20 parts of silica having a specific surface area of 200 $m^2/g$ (Aerosil 200 by Nippon Aerosil Co., Ltd.), and 5 parts of dimethylpolysiloxane blocked with a hydroxydimethylsiloxy radical at either end and having an average degree of polymerization of 5 in a kneader at 100° C. for 3 hours. Using a twin-roll mill, 2.0 parts of an organohydrogenpolysiloxane of the formula (iii):

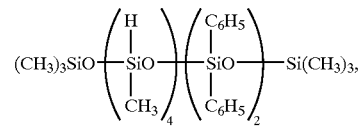

0.06 part of ethynylcyclohexanol as an addition crosslinking regulator, and 0.05 part of a 5% isopropyl alcohol solution of chloroplatinic acid were added to the rubber compound. The composition was press cured at 150° C. for 10 minutes to form a sheet of 1 mm thick. Acid resistance was tested as in Example 1, with the result shown in Table 1.

Comparative Example 1

A rubber compound was prepared by mixing 100 parts of an organopolysiloxane consisting of 99.85 mol % dimethylsiloxane units, 0.125 mol % methylvinylsiloxane units and 0.025 mol % dimethylvinylsiloxane units and having an average degree of polymerization of about 8,000, 20 parts of silica having a specific surface area of 200 $m^2/g$ (Aerosil 200 by Nippon Aerosil Co., Ltd.), and 5 parts of dimethylpolysiloxane blocked with a hydroxydimethylsiloxy radical at either end and having an average degree of polymerization of 5 in a kneader at 100° C. for 3 hours.

Using a twin-roll mill, 2.0 parts of an organohydrogenpolysiloxane of the above formula (ii), 0.06 part of ethynylcyclohexanol as an addition crosslinking regulator, and 0.05 part of a 5% isopropyl alcohol solution of chloroplatinic acid were added to the rubber compound. The composition was press cured at 150° C. for 10 minutes to form a sheet of 1 mm thick. Acid resistance was tested as in Example 1, with the result shown in Table 1.

TABLE 1

|  | Example 1 | Example 2 | Example 3 | Comparative Example 1 |
|---|---|---|---|---|
| Weight change, % | −1.8 | −2.1 | −3.4 | −24.6 |

There has been described a rubber composition which forms a seal member featuring improved acid resistance, weather resistance, creep resistance and gas permeability. The seal member remains effective for a long period of time and is useful in polymer electrolyte fuel-cell separators.

Japanese Patent Application No. 2001-189947 is incorporated herein by reference.

Reasonable modifications and variations are possible from the foregoing disclosure without departing from either the spirit or scope of the present invention as defined by the claims.

What is claimed is:

1. A seal member for sealing a periphery of at least one side of a polymer electrolyte fuel-cell separator, comprising a rubber composition in a cured state, said rubber composition comprising:

(A) a polyisobutylene polymer having an allyl radical on at least one molecular chain-end, (B) an organopolysiloxane of the average compositional formula (1):

$$R^1{}_n SiO_{(4-n)/2} \quad (1)$$

wherein $R^1$ is a substituted or unsubstituted monovalent hydrocarbon radical and may be the same or different and n is a positive number of 1.9 to 2.1, a weight ratio of components (A) to (B) being between 100:0 and 5:95, (C) an organohydrogenpolysiloxane having at least two hydrogen atoms each attached to a silicon atom per molecule, in such an amount as to give 0.2 to 10 silicon-attached hydrogen atoms per aliphatic unsaturated bond in components (A) and (B), said organohydrogenpolysiloxane having an average compositional formula (4)

$$R^4{}_a H_b SiO_{(4-a-b)/2} \quad (4)$$

wherein $R^4$ is a substituted or unsubstituted monovalent hydrocarbon atom, a is a positive number of 0.7 to 2.2, b is a positive number of 0.5 to 1, and a+b is from 1.2 to 3, and (D) a catalytic amount of a platinum group metal catalyst, wherein the rubber composition in a cured state has a weight change of up to 3.4% when immersing it in a 10% aqueous sulfuric acid solution at 100° C. for 500 hours.

2. A seal member for sealing a periphery of at least one side of a polymer electrolyte fuel-cell separator, comprising a rubber composition in a cured state, said rubber composition comprising:

(A) a polyisobutylene polymer having an allyl radical on at least one molecular chain-end, (B) an organopolysiloxane of the average compositional formula (1):

$$R^1{}_n SiO_{(4-n)/2} \quad (1)$$

wherein $R^1$ is a substituted or unsubstituted monovalent hydrocarbon radical and may be the same or different and n is a positive number of 1.9 to 2.1, a weight ratio of components (A) to (B) being between 100:0 and 5:95, (C) an organohydrogenpolysiloxane having at least two hydrogen atoms each attached to a silicon atom per molecule, in such an amount as to give 0.2 to 10 silicon-attached hydrogen atoms per aliphatic unsaturated bond in components (A) and (B), said organohydrogenpolysiloxane having an average compositional formula (4):

$$R^4{}_a H_b SiO_{(4-a-b)/2} \quad (4)$$

wherein $R^4$ is a substituted or unsubstituted monovalent hydrocarbon atom, the content of phenyl group is at least 5 mol % per the total of $R^4$ and H each attached to silicon atoms, a is a positive number of 0.7 to 2.2, b is a positive number of 0.002 to 1, and a+b is from 0.8 to 3, and (D) a catalytic amount of a platinum group metal catalyst.

3. The seal member of claim 1 or 2, wherein the organohydrogenpolysiloxane (C) has a structure of the general formula (2):

$$R^2{}_3 SiO{-}\!\!\left(\!\!\begin{array}{c} R^2 \\ | \\ SiO \\ | \\ R^2 \end{array}\!\!\right)_{\!\!m}\!\!{-}SiR^2{}_3 \quad (2)$$

wherein $R^2$ is hydrogen or a substituted or unsubstituted monovalent hydrocarbon radical and may be the same or different, at least two $R^2$'s are hydrogen atoms, at least 5 mol % of $R^2$ is phenyl, and m is an integer of from 0 to 100.

4. The seal number of claim 1 or 2, wherein the organohydrogenpolysiloxane (C) has a structure of the general formula (3):

$$R^3{}_3 SiO{-}\!\!\left(\!\!\begin{array}{c} R^3 \\ | \\ SiO \\ | \\ R^3 \end{array}\!\!\right)_{\!\!p}\!\!{-}SiR^3{}_3 \quad (3)$$

wherein $R^3$ is hydrogen or a substituted or unsubstituted monovalent hydrocarbon radical and may be the same or different, at least two $R^3$'s are hydrogen atoms, and p is an integer of from 0 to 10.

5. A polymer electrolyte fuel-cell separator comprising a metal plate, and a seal member formed along a periphery on at least one side of the metal plate by injection molding a rubber composition and curing the rubber composition, said rubber composition comprising:

(A) a polyisobutylene polymer having an allyl radical on at least one molecular chain-end, (B) an organopolysiloxane of the average compositional formula (1):

$$R^1{}_n SiO_{(4-n)/2} \quad (1)$$

wherein $R^1$ is a substituted or unsubstituted monovalent hydrocarbon radical and may be the same or different and n is a positive number of 1.9 to 2.1, a weight ratio of components (A) to (B) being between 100:0 and 5:95, (C) an organohydrogenpolysiloxane having at least two hydrogen atoms each attached to a silicon atom per molecule, in such an amount as to give 0.2 to 10 silicon-attached hydrogen atoms per aliphatic unsatur ated bond in components (A) and (B), said organohydrogenpolysiloxane having an average compositional formula (4):

  (4)

wherein $R^4$ is a substituted or unsubstituted monovalent hydrocarbon atom, the content of phenyl group is at least 5 mol % per the total of $R^4$ and H each attached to silicon atoms, a is a positive number of 0.7 to 2.2, b is a positive number of 0.002 to 1, and a+b is from 0.8 to 3, and (D) a catalytic amount of a platinum group metal catalyst, wherein the rubber composition in a cured state has a weight change of up to 3.4% when immersing it in a 10% aqueous sulfuric acid solution at 100° C. for 500 hours.

6. A polymer electrolyte fuel-cell separator comprising a substrate including an electrically conductive powder and a binder, and a seal member formed along a periphery on at least one side of the substrate by injection molding or compression molding a rubber composition and curing the rubber composition, said rubber composition comprising:

(A) a polyisobutylene polymer having an allyl radical on at least one molecular chain-end, (B) an organopolysiloxane of the average compositional formula (1):

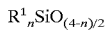  (1)

wherein $R^1$ is a substituted or unsubstituted monovalent hydrocarbon radical and may be the same or different and n is a positive number of 1.9 to 2.1, a weight ratio of components (A) to (B) being between 100:0 and 5:95, (C) an organohydrogenpolysiloxane having at least two hydrogen atoms each attached to a silicon atom per molecule, in such an amount as to give 0.2 to 10 silicon-attached hydrogen atoms per aliphatic unsaturated bond in components (A) and (B), said organohydrogenpolysiloxane having an average compositional formula (4):

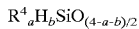  (4)

wherein $R^4$ is a substituted or unsubstituted monovalent hydrocarbon atom, the content of phenyl group is at least 5 mol % per the total of $R^4$ and H each attached to silicon atoms, a is a positive number of 0.7 to 2.2, b is a positive number of 0.002 to 1, and a+b is from 0.8 to 3, and (D) a catalytic amount of a platinum group metal catalyst.

7. The fuel-cell separator of claim 5 or 15, wherein the organohydrogenpolysiloxane (C) has a structure of the general formula (2):

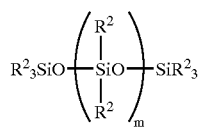  (2)

wherein $R^2$ is hydrogen or a substituted or unsubstituted monovalent hydrocarbon radical and may be the same or different, at least two $R^2$'s are hydrogen atoms, at least 5 mol % of $R^2$ is phenyl, and m is an integer of from 0 to 100.

8. The fuel-cell separator of claim 5 or 6, wherein the organohydrogenpolysiloxane (C) has a structure of the general formula (3):

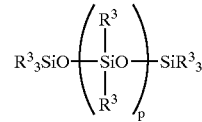  (3)

wherein $R^3$ is hydrogen or a substituted or unsubstituted monovalent hydrocarbon radical and may be the same or different, at least two $R^3$'s are hydrogen atoms, and p is an integer of from 0 to 10.

9. A polymer electrolyte fuel-cell separator comprising a metal plate, and a seal member formed along a periphery on at least one side of the metal plate by injection molding a rubber composition and curing the rubber composition, said rubber composition comprising:

(A) a polyisobutylene polymer having an allyl radical on at least one molecular chain-end, (B) an organopolysiloxane of the average compositional formula (1)

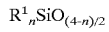  (1)

wherein $R^1$ is a substituted or unsubstituted monovalent hydrocarbon radical and may be the same or different and n is a positive number of 1.9 to 2.1, a weight ratio of components (A) to (B) being between 100:0 and 5:95, (C) an organohydrogenpolysiloxane having at least two hydrogen atoms each attached to a silicon atom per molecule, in such an amount as to give 0.2 to 10 silicon-attached hydrogen atoms per aliphatic unsaturated bond in components (A) and (B), said organohydrogenpolysiloxane having an average compositional formula (4):

  (4)

wherein $R^4$ is a substituted or unsubstituted monovalent hydrocarbon atom, a is a positive number of 0.7 to 2.2, b is a positive number of 0.5 to 1, and a+b is from 1.2 to 3, and (D) a catalytic amount of a platinum group metal catalyst, wherein the rubber composition in a cured state has a weight change of up to 3.4% when immersing it in a 10% aqueous sulfuric acid solution at 100° C. for 500 hours.

10. A polymer electrolyte fuel-cell separator comprising a substrate including an electrically conductive powder and a binder, and a seal member formed along a periphery on at least one side of the substrate by injection molding or compression molding a rubber composition and curing the rubber composition, said rubber composition comprising:

(A) a polyisobutylene polymer having an allyl radical on at least one molecular chain-end, (B) an organopolysiloxane of the average compositional formula (1):

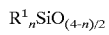  (1)

wherein $R^1$ is a substituted or unsubstituted monovalent hydrocarbon radical and may be the same or different and n is a positive number of 1.9 to 2.1, a weight ratio of components (A) to (B) being between 100:0 and 5:95, (C) an organohydrogenpolysiloxane having at least two hydrogen atoms each attached to a silicon atom per molecule, in such an amount as to give 0.2 to 10 silicon-attached hydrogen atoms per aliphatic unsaturated bond in components (A) and (B), said organohydrogenpolysiloxane having an average compositional formula (4):

$$R^4_a H_b SiO_{(4-a-b)/2} \quad (4)$$

wherein $R^4$ is a substituted or unsubstituted monovalent hydrocarbon atom, a is a positive number of 0.7 to 2.2, b is a positive number of 0.5 to 1, and a+b is from 1.2 to 3, and (D) a catalytic amount of a platinum group metal catalyst.

11. The fuel-cell separator of claim 3 or 10, wherein the organohydrogenpolysiloxane (C) has a structure of the general formula (2):

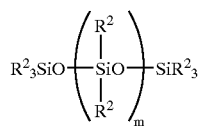
(2)

wherein $R^2$ is hydrogen or a substituted or unsubstituted monovalent hydrocarbon radical and may be the same or different, at least two $R^2$'s are hydrogen atoms, at least 5 mol % of $R^2$ is phenyl, and m is an integer of from 0 to 100.

12. The fuel-cell separator of claim 3 or 10, wherein the organohydrogenpolysiloxane (C) has a structure of the general formula (3):

(3)

wherein $R^3$ is hydrogen or a substituted or unsubstituted monovalent hydrocarbon radical and may be the same or different, at least two $R^3$'s are hydrogen atoms, and p is an integer of from 0 to 10. OLD OLD OLD OLD OLD OLD

* * * * *